(12) United States Patent
Nakayama (10) Patent No.: US 9,848,101 B2
(45) Date of Patent: Dec. 19, 2017

(54) IMAGE PROCESSING DEVICE (71) Applicant: Kabushiki Kaisha Tokyo Kikai Seisakusho, Tokyo (JP)

(72) Inventor: Sadatsugu Nakayama, Kisarazu (JP)

(73) Assignee: Kabushiki Kaisha Tokyo Kikai Seisakusho, Tokyo (JP)

( * ) Notice: Subject to any disclaimer, the term of this patent is extended or adjusted under 35 U.S.C. 154(b) by 0 days.

(21) Appl. No.: 15/515,764

(22) PCT Filed: Oct. 21, 2014

(86) PCT No.: PCT/JP2014/077987
§ 371 (c)(1),
(2) Date: Mar. 30, 2017

(87) PCT Pub. No.: WO2016/063359
PCT Pub. Date: Apr. 28, 2016

(65) Prior Publication Data
US 2017/0302815 A1 Oct. 19, 2017

(51) Int. Cl.
*H04N 1/21* (2006.01)
*H04N 1/407* (2006.01)
*G06T 1/60* (2006.01)
*H04N 1/00* (2006.01)

(52) U.S. Cl.
CPC ............ *H04N 1/2129* (2013.01); *G06T 1/60* (2013.01); *H04N 1/407* (2013.01); *H04N 1/00127* (2013.01); *H04N 1/00132* (2013.01)

(58) Field of Classification Search
None
See application file for complete search history.

(56) References Cited

U.S. PATENT DOCUMENTS

| 4,734,782 A * | 3/1988 | Maeshima | H04N 1/405 358/3.21 |
| 2007/0286481 A1 | 12/2007 | Monobe et al. | |
| 2010/0220362 A1 * | 9/2010 | Shepherd | H04N 1/405 358/3.06 |

(Continued)

FOREIGN PATENT DOCUMENTS

| CN | 1842781 A | 10/2006 |
| CN | 1937701 A | 3/2007 |

(Continued)

*Primary Examiner* — WB Perkey
(74) *Attorney, Agent, or Firm* — The Webb Law Firm (57) ABSTRACT

Provided are: a main memory 14 that stores image data, a peripheral region 44 being set to a certain value; and a CPU 12 that performs tonal steps conversion processing on the image data. The CPU 12 includes: a plurality of cores 16 that have a parallel processing function due to a plurality of threads 18 and that execute the tonal steps conversion processing in parallel; and a data cache memory 22 and program cache memory 20 that are provided corresponding to each of the plurality of threads 18. The core 16 specifies a region smaller than a size of the data cache memory 22, of the image data as an operand region 48, and causes the image data corresponding to said operand region 48 to be acquired from the main memory 14 into the data cache memory 22 and executes the tonal steps conversion processing on said operand region 48 without distinction of a central region 42 and the peripheral region 44.

8 Claims, 8 Drawing Sheets

(56) References Cited

U.S. PATENT DOCUMENTS

2012/0089762 A1\* 4/2012 Zhu ................. H04L 49/109
                                                    710/305
2013/0335474 A1\* 12/2013 Yanai ................. H04N 1/405
                                                     347/15

FOREIGN PATENT DOCUMENTS

| CN | 101867681 A | 10/2010 |
|----|-------------|---------|
| JP | 9205546 A | 8/1997 |
| JP | 200625220 A | 1/2006 |
| JP | 2006259821 A | 9/2006 |
| JP | 2007500886 A | 1/2007 |
| JP | 2007129613 A | 5/2007 |
| JP | 2007310450 A | 11/2007 |
| JP | 200817458 A | 1/2008 |
| JP | 2008306427 A | 12/2008 |
| JP | 2012242855 A | 12/2012 |
| WO | 2005013061 A2 | 2/2005 |

\* cited by examiner

IMAGE PROCESSING DEVICE

CROSS-REFERENCE TO RELATED APPLICATION

This application is the United States national phase of International Application No. PCT/JP2014/077987 filed Oct. 21, 2014, the disclosure of which is hereby incorporated in its entirety by reference.

TECHNICAL FIELD

Embodiments described in the present specification relate to an image processing device of a digital printer.

BACKGROUND ART

Currently, a trend of society is changing from conventional small-variety mass production to large-variety small-quantity production. In the production field of publications represented by books, pamphlets, magazines, and newspapers, too, large-variety small-quantity production using a business-purpose digital printer has begun to receive attention, after going through a period of small-variety mass production using a high-speed offset rotary press.

As one example of a digital printer, an inkjet type printer that prints by jetting ink onto a paper by heat or pressure, is known. Moreover, in such a printer, a printer comprising a plurality of print heads corresponding to a plurality of colors (for example, cyan (C), magenta (M), yellow (Y), and black (K)), is known.

In the above-mentioned inkjet type printer, a carriage system in which a plurality of printing color portions (for example, the previously described four color portions of C, M, Y, and K) are disposed gathered into one in a shuttle type print head, and printing is performed on a sheet, is known. Said system is suitable for depiction of a fine image. Moreover, as another system, a single-pass system in which, with respect to a continuous paper moving in one direction, a plurality of single color printing-dedicated print heads are disposed so as to cover a paper width in a paper width direction thereby forming a print head group, and furthermore, a plurality of printing color portions (for example, the previously described four color portions of C, M, Y, and K) of the above-mentioned single color printing-dedicated print head groups are disposed in a moving direction of the continuous paper, is known. Said system is suitable for high-speed printing.

When printing image data in the above-mentioned business-purpose digital printer, a data amount to be processed is extremely large compared to a data amount in general household and office printing, hence a long time is required for processing. Therefore, conventionally, various kinds of image processing such as so-called rasterization processing (RIP: Raster Image Processing), four color separation processing, tonal steps conversion processing, and rearrangement processing of data corresponding to placement of ink head, were performed prior to printing.

PRIOR ART DOCUMENT

Patent Document

Patent Document 1: JP 2007-310450 A

SUMMARY OF INVENTION

Problem to be Solved by the Invention

In recent years, since it has become necessary to deal with on-demand printing (Print on Demand: POD) of a small number of copies or continuous on-demand printing of small numbers of copies to be completed in a short time (so-called on-the-fly printing), it has become required to perform printing, while simultaneously and continuously performing image processing for the next printing. Moreover, in order to enable the above-described on-the-fly printing and its accompanying image processing, speeding up of the image processing in the digital printer has become required.

In view of the above-mentioned problems, the embodiments described in the present specification have an object of speeding up image processing in a digital printer.

Means for Solving the Problem

An image processing device according to an embodiment comprises: a main memory that stores image data, a peripheral region excluding a central region where image processing is required, of a whole region of the image data being set to a certain value; and a CPU that performs tonal steps conversion processing on the image data. The CPU includes: a plurality of cores that have a parallel processing function due to a plurality of threads and that execute the tonal steps conversion processing in parallel; and a data cache memory and program cache memory that are provided corresponding to each of the plurality of threads. The core specifies a region smaller than a size of the data cache memory, of the image data as an operand region, and causes the image data corresponding to said operand region to be acquired from the main memory into the data cache memory and executes the tonal steps conversion processing on said operand region without distinction of the central region and the peripheral region.

EMBODIMENTS FOR CARRYING OUT THE INVENTION

Image processing devices according to embodiments of the present invention will be described below with reference to the drawings.

First Embodiment

Figure 1:
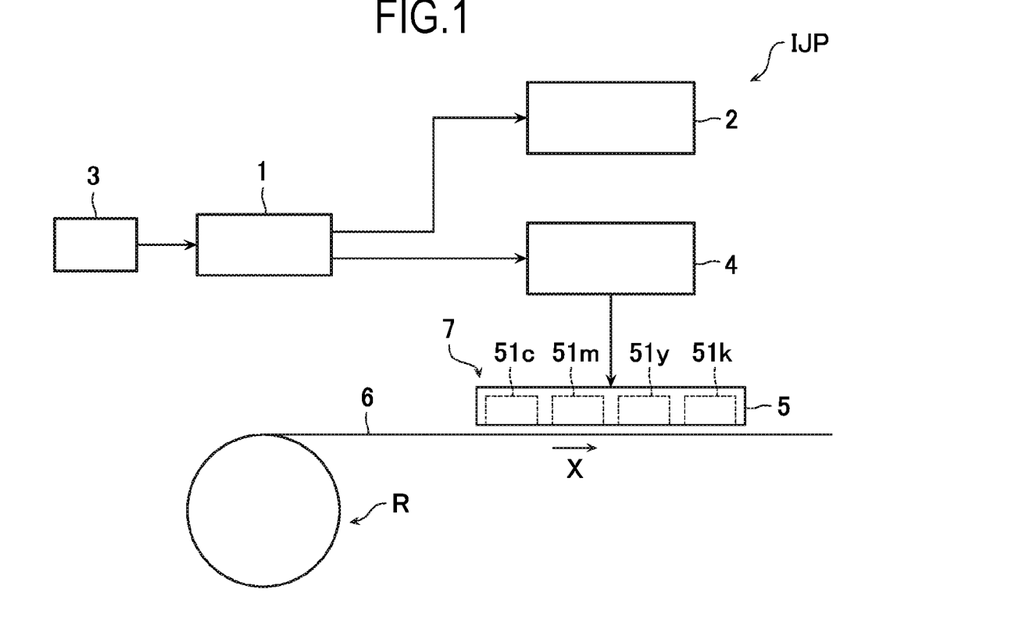
FIG. 1 is an overall schematic view of a printer including an image processing device according to a first embodiment.

FIG. 1 is an overall schematic view of a printer IJP including an image processing device according to a first embodiment. The printer IJP comprises: a paper feeder SP capable of supplying a printing paper 6 which is continuous, toward a downstream side; and a printing unit 7 that includes a print head unit 5 for performing inkjet printing on the printing paper 6. The arrow X in the drawing shows a moving direction of the printing paper 6. Moreover, the printer IJP comprises: a paper conveying unit 3 that sends forth the printing paper 6 to the downstream side by a rotary roller 31; and a post-processing device 7 that cuts or cuts and folds the printed printing paper 6. Provided along with the rotary roller 31 is an encoder 32 that outputs a pulse signal every certain amount of rotation.

The print head unit 5 comprises a print head group 51 that has a plurality of print heads (not illustrated) smaller than a width dimension of the printing paper 6 disposed aligned in a width direction of the printing paper 6. In the present embodiment, print head groups 51c, 51m, 51y, and 51k capable of simultaneously printing four colors are adopted, and respectively correspond to colors of cyan (C), magenta (M), yellow (Y), and black (B). Moreover, connected to the print head unit 5 is a print head control unit 4 that controls the print head unit 5.

The print head control unit 4 is connected to a processing server 1. This processing server 1 has a function of performing rasterization processing (RIP), a function of performing color separation processing, a function of performing tonal steps conversion processing, and a function of performing imposition processing, of inputted image data. In addition, the processing server 1 has a job operation function that performs setting of the number of print copies and single-side/double-side printing, a schedule management function of a job whose printing preparation has been completed, a control function of the printer IJP, and a display function of a printing status. The processing server 1, as well as being connected to the print head control unit 4, is connected also to a printer control unit 2. The printer control unit 2 controls operation of each of devices excluding the print head unit 5, of the printer IJP.

Figure 2:
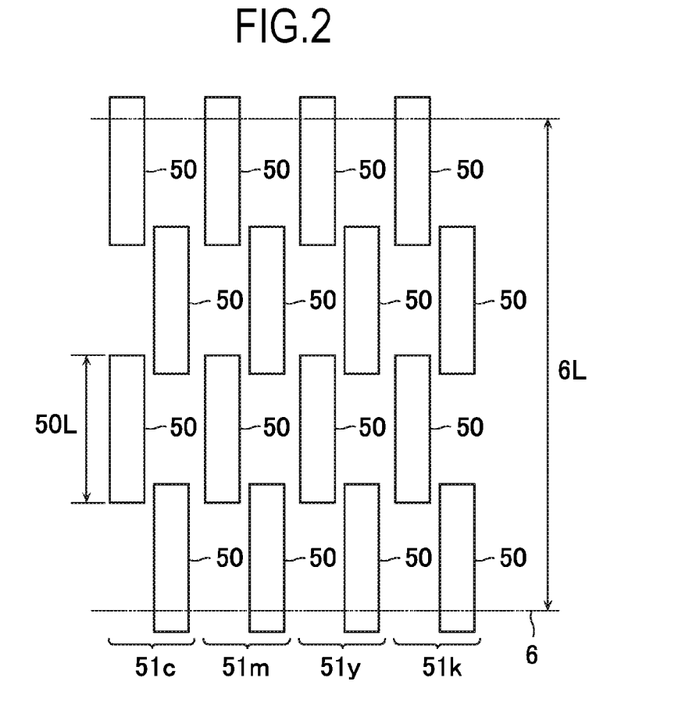
FIG. 2 is a planar schematic view showing a configuration of a print head unit.

FIG. 2 is a planar schematic view showing an arrangement of the print heads in the print head unit 5. Disposed in the moving direction (left-right direction of plane of paper) of the printing paper 6 which is a continuous paper are the four print head groups 51c (C: cyan), 51m (M: magenta), 51y (Y: yellow), and 51k (K: black) corresponding to a print color portion. Each of the print head groups includes four print heads 50 disposed staggered in the width direction (up-down direction of plane of paper) of the printing paper 6. If a width of the printing paper 6 is assumed to be 6L and a length of the print head 50 in said direction is assumed to be 50L, then lengths of widths of the print head 50 and the printing paper 6 are set such that an arrangement width of the print heads 50 (50L×4 or less) is larger than a paper width of the printing paper 6 (6L).

Figure 3:
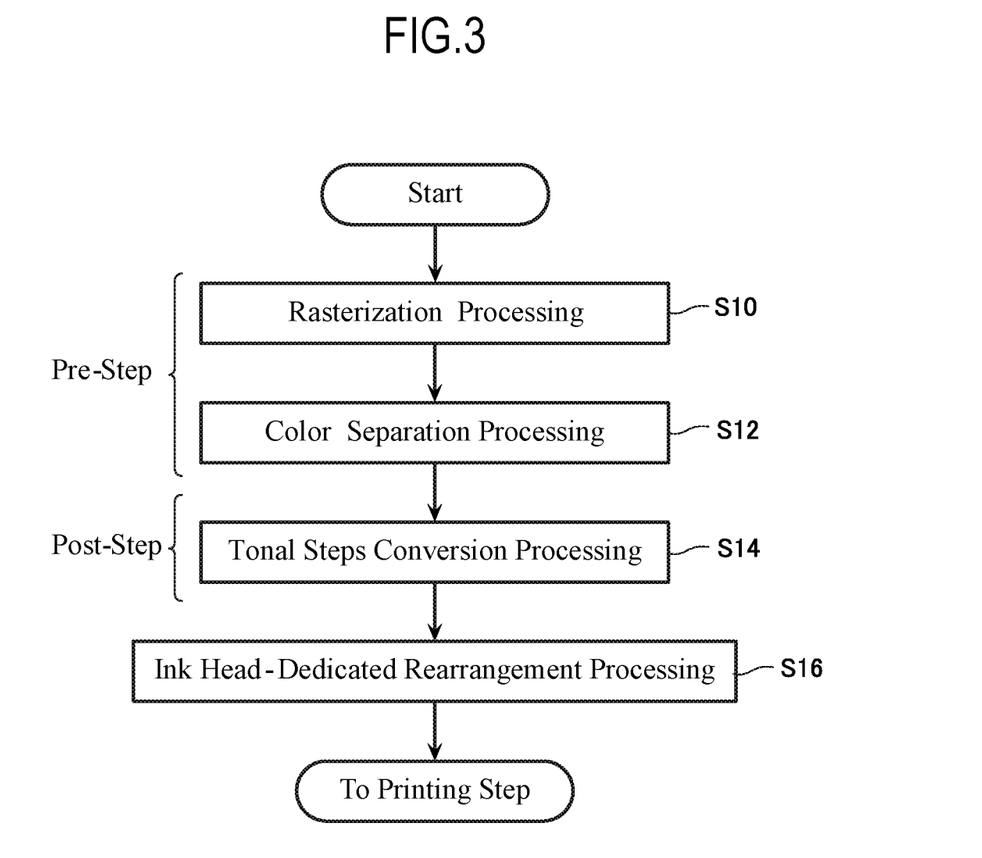
FIG. 3 is a flowchart showing a flow of image processing in the printer.

FIG. 3 is a flowchart showing a flow of image processing in the printer IJP. First, the processing server 1 performs rasterization processing on image data (for example, image data expressed by a system such as PDF (Portable Document Format) and PS (Postscript)) inputted from the likes of another information processing terminal or storage medium (step S10). Rasterization refers to processing that converts the likes of line image data expressed by a vector amount, for example, to raster image data which is a set of points (dots).

Next, the processing server 1 executes color separation processing (step S12). Color separation processing refers to processing that breaks down color image data into data of each of a plurality of colors. The present embodiment describes an example where as previously mentioned, four color separation processing into cyan (C), magenta (M), yellow (Y), and black (B) is performed, but it is also possible to employ a number of colors and separations besides this.

Next, the processing server 1 executes tonal steps conversion processing (step S14). Tonal steps conversion processing (Gradation conversion processing) refers to processing that determines a physical dot arrangement by reducing color data of a continuous tonal steps having a high resolution (for example, 8 dots or more) to a number of tonal steps capable of being output by the printer. Tonal steps conversion processing is sometimes also called error diffusion processing, dithering processing, and so on. Tonal steps conversion processing is performed as part of droplet conversion processing that converts image data to a droplet amount of ink, and details thereof will be described by FIG. 5.

Returning to FIG. 3, the processing server 1, having performed necessary processing such as imposition processing on the image data whose tonal steps conversion processing has been completed, transfers said data to the print head control unit 4. In the description below, up to the color separation processing of step S12, of processing executed by the processing server 1, will be referred to as a "pre-step", and processing of the tonal steps conversion processing of step S14 and thereafter, of processing executed by the processing server 1, will be referred to as a "post-step".

Next, the print head control unit 4 executes processing that rearranges image data sent from the processing server 1, based on an arrangement of the individual print heads (refer to FIG. 3) in the print head unit 5 (step S16). Then, the print head control unit 4 executes a following printing step based on a command from the processing server 1.

In the printing step, drawing (printing) of characters/images by the print head unit 5 is performed on the printing paper 6 sent forth in a certain direction (arrow X direction of FIG. 1) from the roll paper R. The print head unit 5 executes the printing based on a drawing timing signal inputted from the print head control unit 4.

In the printer IJP according to the present embodiment, transfer of image data from the processing server 1 to the print head control unit 4 is performed in real time in parallel with the above-mentioned printing step. However, the pre-step (rasterization processing and color separation processing) and post-step (tonal steps conversion processing) in the processing server 1 are each performed prior to the printing step, hence a standby time due to image processing before printing start becomes necessary. If said standby time becomes long, then achievement of a printing system that performs the printing step and continuously performs the next manuscript input and image processing, that is, achievement of so-called on-the-fly printing, ends up becoming difficult. Accordingly, in order to achieve a shortening of the time before printing start and achieve the previously mentioned on-the-fly printing, speeding up of image processing in the processing server 1 is a problem.

Figure 4:
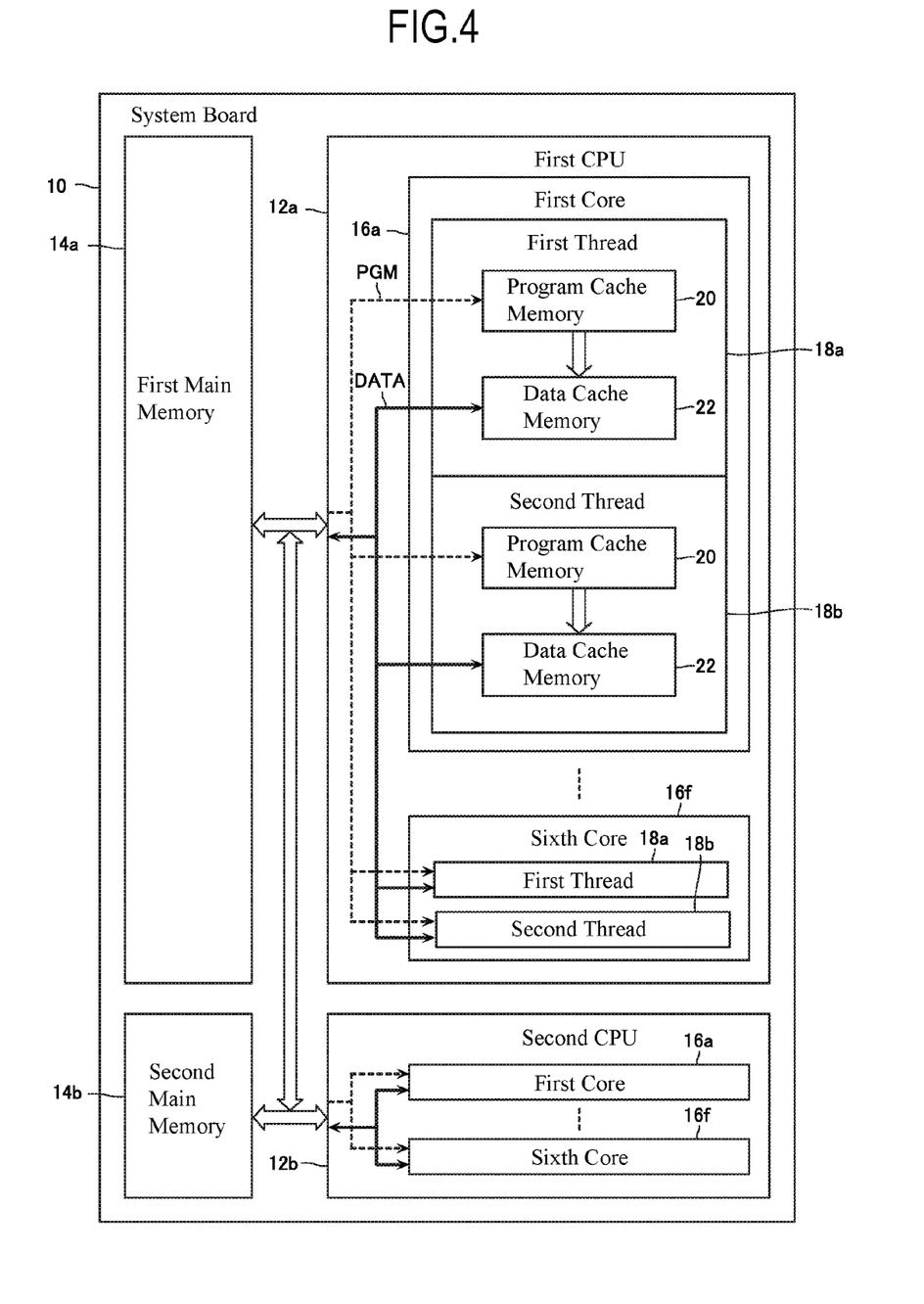
FIG. 4 is a block diagram showing a main configuration of the image processing device.

FIG. 4 is a block diagram showing a main configuration of the processing server 1 which is one example of the image processing device. A CPU 12 (Central Processing Unit) and a main memory 14 are disposed on a system board 10 of the processing server 1. A memory capable of high-speed operation (for example, a volatile RAM (Random Access Memory), or the like) is preferably employed in the main memory 14. In the present embodiment, the processing server 1 comprises two each of the CPU and the main memory. Hereafter, when necessary to distinguish between the two, they will be respectively referred to as a first CPU 12a and second CPU 12b, and a first main memory 14a and second main memory 14b (the same applies also to other configurations).

Each CPU 12 comprises a plurality of cores 16 that each independently perform computational processing. In the present embodiment, each CPU 12 comprises six cores, that is, a first core 16a through sixth core 16f, but the number of cores may be other than this. Furthermore, each core 16 has a parallel processing function due to a plurality of threads 18. In the present embodiment, there is a configuration in which there are two threads (a first thread 18a and a second thread 18b) per one core.

Moreover, the CPU 12 comprises a program cache memory 20 and a data cache memory 22 which are data storage regions. These are storage units provided separately to a region (not illustrated) where computational processing is performed in each core, and are configured capable of higher speed data transfer compared to data transfer between fellow main memories 14. Conceptually, one each of the program cache memory 20 and the data cache memory 22 are provided to each thread 18 in each core 16.

The outline arrow shown in the drawing indicates data transferred between each of blocks. In the printer IJP of the present embodiment, image data and program data are mainly a target of transfer. These data are directly transferred between the CPU 12 and the main memory 14, without going through a nonvolatile memory device, hence making it possible to achieve speeding up of data transfer.

Moreover, the solid line arrow DATA in the drawing indicates a transfer direction of image data, and the dotted line arrow PGM in the drawing indicates a transfer direction of program data. Image data (DATA) is transferred bi-directionally between the data cache memory 22 and the main memory 14, but program data (PGM) is transferred only in one direction from the main memory 14 to the program cache memory 20. Program data that has served its purpose is rewritten by being overwritten by the next data on the program cache memory 20, at a timing of the next data write.

As described above, the image processing device according to the present embodiment is provided with the plurality of cores 16a to 16f in the plurality of CPUs 12a to 12b, and furthermore is configured capable of parallel processing due to the plurality of threads 18a to 18b in each of the cores 16. As a result, the image processing of the pre-step and the post-step shown in FIG. 3 can be performed by parallel processing. However, speeding up of image processing cannot be sufficiently achieved simply by parallelizing the image processing. This point will be described below.

Figure 5:
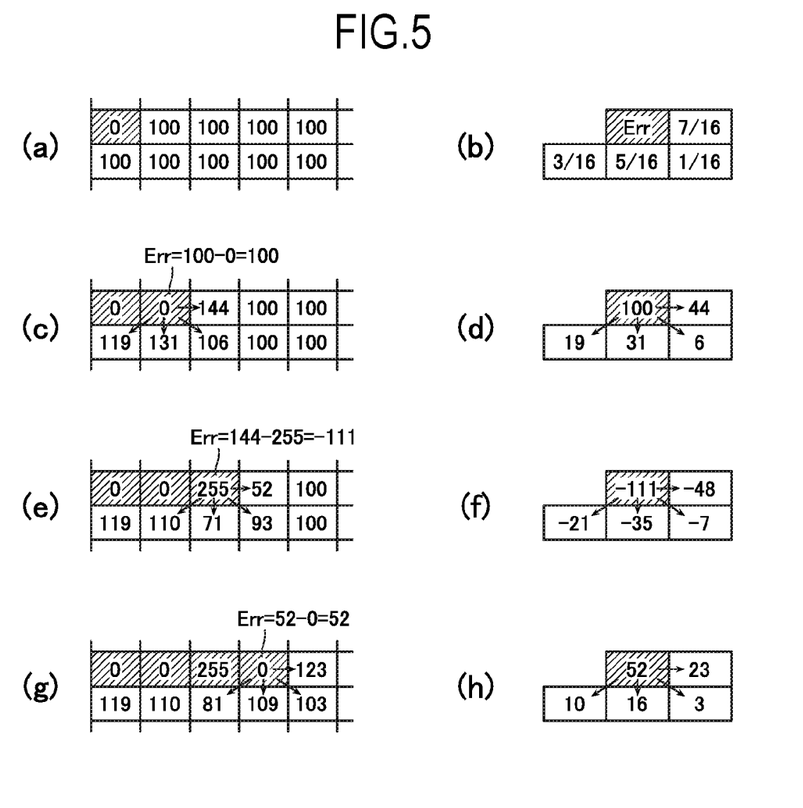
FIG. 5 is a schematic view for explaining tonal steps conversion processing.

FIG. 5 is a schematic view for explaining the tonal steps conversion processing (gradation conversion processing) in step S14 of FIG. 3, of the image processing, and shows tonal steps conversion processing referred to as so-called "error diffusion". FIGS. 5(a), (c), (e), and (g) each show image data disposed in a dot shape. FIGS. 5(b), (d), (f), and (h) each show an error diffusion table.

FIG. 5 is a view showing an example of binarization processing in image data of 256 tonal steps (256 gradations). Assuming a threshold to be 128, data smaller than 128 is converted to 0, and data of 128 or more is converted to 256. A difference of pre-tonal steps conversion data (pre-gradation conversion data) and post-tonal steps conversion data (post-gradation conversion data) is an "error (Err)". As shown in FIG. 5(b), focusing on the dot indicated by "Err", the error is diffused in a ratio of 7/16 to the right, 1/16 to below right, 5/16 to below, and 3/16 to below left. Values of the error diffusion table of FIG. 5(b) can be set arbitrarily.

In FIG. 5(a), only the upper left dot (portion where a value is "0") has the tonal steps conversion processing completed. In drawings thereafter, a dot where the tonal steps conversion processing has been completed is shown by hatching.

In FIG. 5(c), a value of the upper tier second from left dot is 100 (<128), hence a post-tonal steps conversion value is "0". At this time, an error is Err=100−0=100. As a result, diffusion errors (44, 6, 31, and 19 clockwise from the right neighboring dot) of the error diffusion table shown in FIG. 5(d) are added to peripheral dots in FIG. 5(c) (144, 106, 131, and 119).

In FIG. 5(e), a value of the upper tier third from left dot is 144 (≥128), hence a post-tonal steps conversion value is "255". At this time, an error is Err=144−255=−111, and is a negative value. As a result, diffusion errors (−48, −7, −35, and −21 clockwise from the right neighboring dot) of the error diffusion table shown in FIG. 5(f) are added to peripheral dots in FIG. 5(e) (52, 93, 71, and 110).

In FIG. 5(g), a value of the upper tier fourth from left dot is 52 (<128), hence a post-tonal steps conversion value is "0". At this time, an error is Err=52−0=52. As a result, diffusion errors (23, 3, 16, and 10 clockwise from the right neighboring dot) of the error diffusion table shown in FIG. 5(h) are added to peripheral dots in FIG. 5(g) (123, 103, 109, and 81).

Due to the above-described error diffusion, by having an error occurring during binarization added to peripheral dots in a certain ratio, an appearance of a post-tonal steps conversion processing image can be brought closer to a pre-tonal steps conversion processing image, compared to when simply performing binarization.

Figure 6:
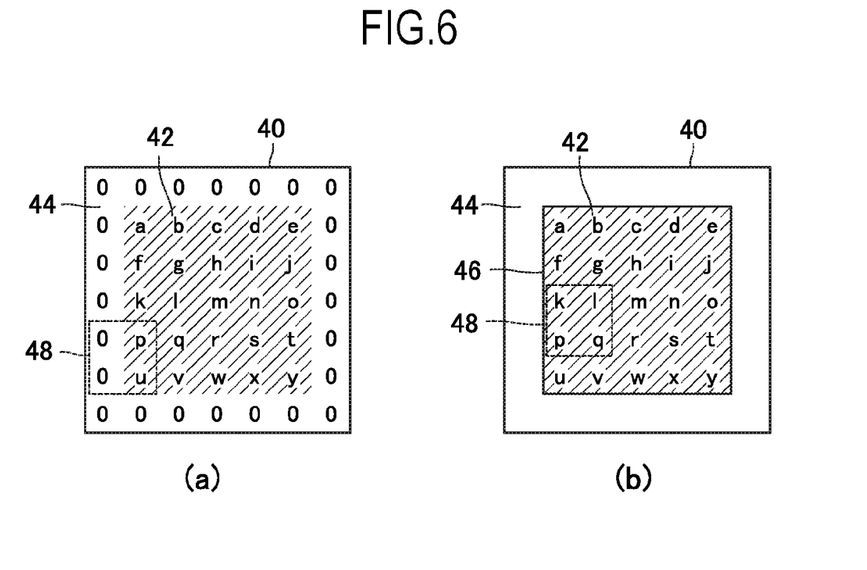
FIG. 6 is a schematic view showing image data.

FIG. 6 is a schematic view showing image data. FIG. 6(a) shows image data in the present embodiment, and FIG. 6(b) shows general image data for comparison. As shown in FIG. 6(b), in general image data, a region where image conversion processing is required (referred to below as a "central region 42"), of a whole region 40 is partitioned from another region (referred to below as a "peripheral region 44") by a boundary line 46. Therefore, a region which is a target of the tonal steps conversion processing shown in FIG. 5 (referred to below as an "operand region 48") is limited to image data (a to f) existing in the central region 42. In this case, there is a problem that the core 16 of the CPU 12 must perform tonal steps conversion processing while performing determination processing of the boundary line 46 one by one, hence the image processing ends up taking time.

In contrast, in the present embodiment shown in FIG. 6(a), the peripheral region 44 is set beforehand to a certain value (assumed to be "0" in the present embodiment). In other words, the boundary line 46 does not exist between the central region 42 and the peripheral region 44, hence the operand region 48 shown in FIG. 6(a) may include the peripheral region 44. However, even in view of the error diffusion described by FIG. 5, a dot of a portion where "0" is disposed, of the peripheral region 44 has a post-tonal steps conversion processing value of "0", hence does not substantively influence the tonal steps conversion processing. In this case, the core 16 of the CPU 12 does not need to perform determination processing of the boundary line 46 one by one, hence a time of the image processing can be shortened. Note that in the present embodiment, the certain value set beforehand in the peripheral region 44 is assumed to be "0", but said certain value is not limited to "0", and any value may be employed, provided it does not combine with (does not influence) data of the central region 42 in the tonal steps conversion processing.

The image data of the whole region 40 shown in FIG. 6(*a*) exists on the main memory 14. In tonal steps conversion processing, the core 16 of the CPU 12 transfers image data included in the operand region 48 into the data cache memory 22 in the corresponding thread 18. As a result, while tonal steps conversion processing is being executed on the operand region 48, transfer of data is performed between the program cache memory 20 and the data cache memory 22 inside the thread 18. As a result, a data transfer amount between the main memory 14 and the data cache memory 22 can be reduced, and the time of the image processing can be shortened. When tonal steps conversion processing of the operand region 48 has been completed, the core 16 transfers said processing-completed data from the data cache memory 22 to the main memory 14 and acquires new unprocessed data from the main memory 14.

As described above, due to the image processing device according to the present embodiment, the core 16 in the CPU 12 specifies a region smaller than a size of the data cache memory 22, of the image data as the operand region 48. Moreover, the core 16 causes image data corresponding to the operand region 48 to be acquired from the main memory 14 into the data cache memory 22 and executes tonal steps conversion processing on the operand region 48 without distinction of the central region 42 and the peripheral region 44. As a result, there is no need for determination processing of the boundary line 46 to be performed one by one, and the data transfer amount between the main memory 14 and the data cache memory 22 can be reduced. By performing the above-described contrivance in addition to the parallelization of image processing described by FIG. 4 in this way, a significant speeding up of the image processing can be achieved.

In the above-described embodiment, the program cache memory 20 in the CPU 12 is preferably of a size capable of storing a program for the core 16 to execute the tonal steps conversion processing. In this case, the program size may be reduced so as to be capable of being stored in the program cache memory 20. As a result, reading from the main memory 14, of a program required when performing the tonal steps conversion processing, is completed simply at a start time of the processing, and subsequently, there is no need for transfer of the program data to be performed between the main memory 14 and the program cache memory 20. As a result, a data transfer amount between the main memory 14 and the program cache memory 20 can be reduced, and speeding up of the image processing can be further achieved.

In the above-described embodiment, it is preferable to adopt a configuration that prevents a surplus of data occurring when transferring image data from the main memory 14 to the data cache memory 22. This point will be described below.

Figure 7:
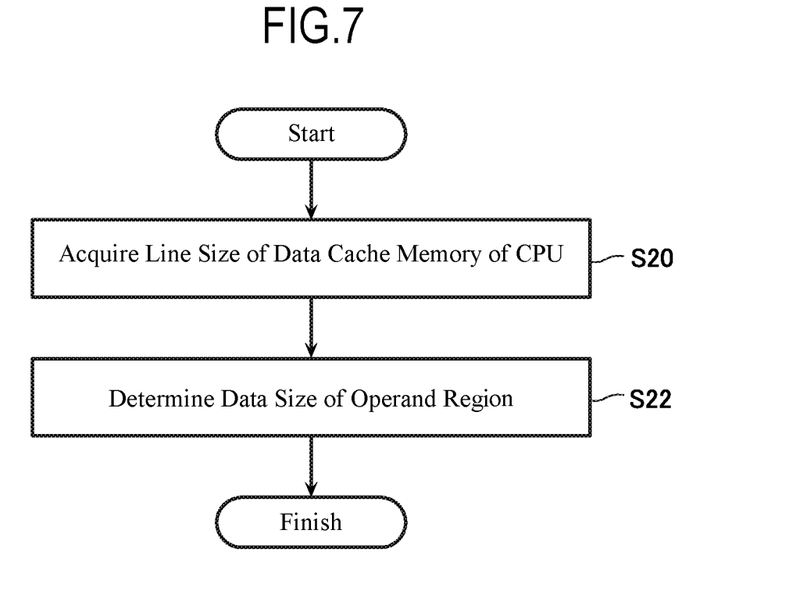
FIG. 7 is a flowchart showing a method of determining a data size of an operand region 48.

FIG. 7 is a flowchart showing a method of determining a data size of the operand region. First, the core 16 functioning as a control unit of the processing server 1 acquires a line size (amount of data downloaded per one time of transfer, referred to below as "cache line size") of the data cache memory 22 in the CPU 12 (step S20). Various sizes (for example, 64 bytes, 32 bytes, and so on) of this cache line size are assumed, depending on a specification of the CPU. Then, the core 16 determines the data size of the operand region 48 of FIG. 6(*a*), based on the cache line size acquired in step S20 (step S22).

Now, data size of the operand region 48 is preferably determined so as to prevent a surplus from being produced during data cache memory 22 data transfer. For example, it is preferable to configure the operand 48 to be a data size no more than the cache line size, in a manner that if the cache line size is 64 bytes, then the data size of the operand region 48 is also 64 bytes, and thereby configure so as to prevent a surplus from being produced per one time transfer amount. As a result, the number of times of data transfer between the main memory 14 and the data cache memory 22 can be reduced to a minimum number of times, compared to when the data size of the operand region 48 is set larger than the cache line size. As a result, speeding up of the image processing can be achieved. (In the above-described example, in the case that, for example, data size of the operand region 48 is 65 bytes, then when the line size is 64 bytes, two times of transfer become required, and double the number of times of transfer ends up being required).

Moreover, in the above-described embodiment, it is preferable to adopt a configuration so as to prevent a processing wait of unprocessed data occurring when transferring image data from the main memory 14 to the data cache memory 22. This point will be described in detail below.

Figure 8:
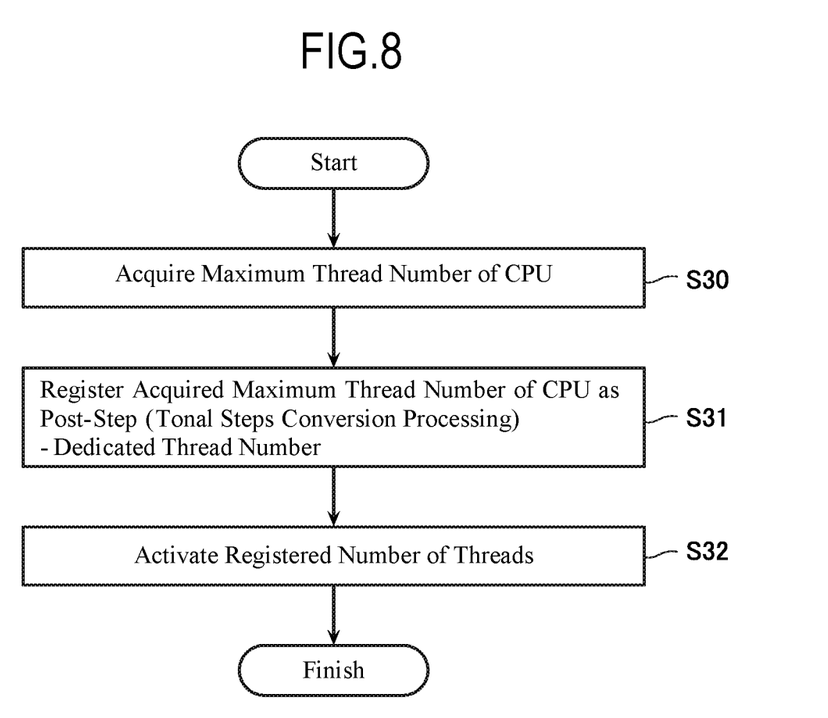
FIG. 8 is a flowchart (No. 1) showing an operation of the image processing device according to the first embodiment.

FIG. 8 is a flowchart showing a method of registering the number of parallel operation threads in the CPU 12. First, the core 16 functioning as the control unit of the processing server 1 acquires the maximum number of threads capable of parallel operation in the CPU 12 having an identical processing speed (step S30). This maximum thread number is achieved by a plurality of the CPUs 12, a plurality of the cores 16, and a plurality of the threads 18, and various numbers thereof (for example, one thread or two threads per one core 16, and so on) are assumed, depending on the specification of the CPU. The maximum thread number may be acquired from an operating system (OS: Operating System) controlling the CPU 12, for example. Then, the core 16 registers the maximum thread number acquired in step S30 as a post-step-dedicated thread number for performing the tonal steps conversion processing (step S31). Then, the CPU 12 activates the threads 18 corresponding to the registered number (step S32). As a result, the above-described number of threads 18 attain an operation state of being capable of receiving unprocessed image data from the main memory 14 and of being capable of performing the tonal steps conversion processing immediately after the image data has been transferred. Note that in the description below, a state of the thread 18 being in-operation and not in-processing is sometimes referred to as a "standby state".

Now, a comparative embodiment configured such that a parallel operation number of the threads 18 is adjusted according to a load of the CPU 12, will be described. In this case, as the load of the CPU 12 rises after unprocessed data has been sent in a large quantity at one time from the main memory 14, the threads are sequentially activated until the maximum number of threads capable of parallel operation is reached. As a result, a processing wait of unprocessed data ends up occurring while the parallel operation number of the threads 18 (number of activated threads) is reaching the maximum thread number.

In contrast, in FIG. 8, the maximum number of threads capable of parallel operation in the CPU 12 is acquired beforehand, and that numerical value is registered as the post-step-dedicated thread number for performing the tonal steps conversion processing. As a result, whereas in the above-described comparative embodiment, only minimum required threads (for example, two threads) are activated, in the present embodiment, the maximum number of threads capable of parallel operation (for example, 24 threads) are always activated, and on standby in a state of being capable of parallel operation. As a result, even if unprocessed data is sent in a large quantity at one time from the main memory 14 to the data cache memory 22, processing can be started immediately without a processing wait occurring.

For example, the case where, in the above-described specific example, a 20 item portion of data arranged to the cache line size of the operand region 48 has been sent to the threads 18, will be described. According to the comparative embodiment, since two threads only are on standby in the state of being capable of parallel operation, data processing is started for a mere two items only of the 20 items of data. The remaining 18 items of data end up being in a state of processing wait until the load of the CPU 12 rises and the time-out state threads are activated. In contrast, according to the present embodiment of FIG. 8, the previously registered 24 threads are in the standby state, and the entire 20 item portion of sent data can be parallel processed immediately.

As described above, in order to configure so as to prevent a processing wait of unprocessed data from occurring during data transfer from the main memory 14 to the data cache memory 22, it is preferable for the number of threads for performing post-step processing in parallel to be determined (registered) beforehand.

Moreover, in the above-described embodiment, it is preferable to adopt a configuration that prevents data from being mutually held up when transferring data between the main memory 14 and the data cache memory 22. This point will be described in detail below.

Figure 9:
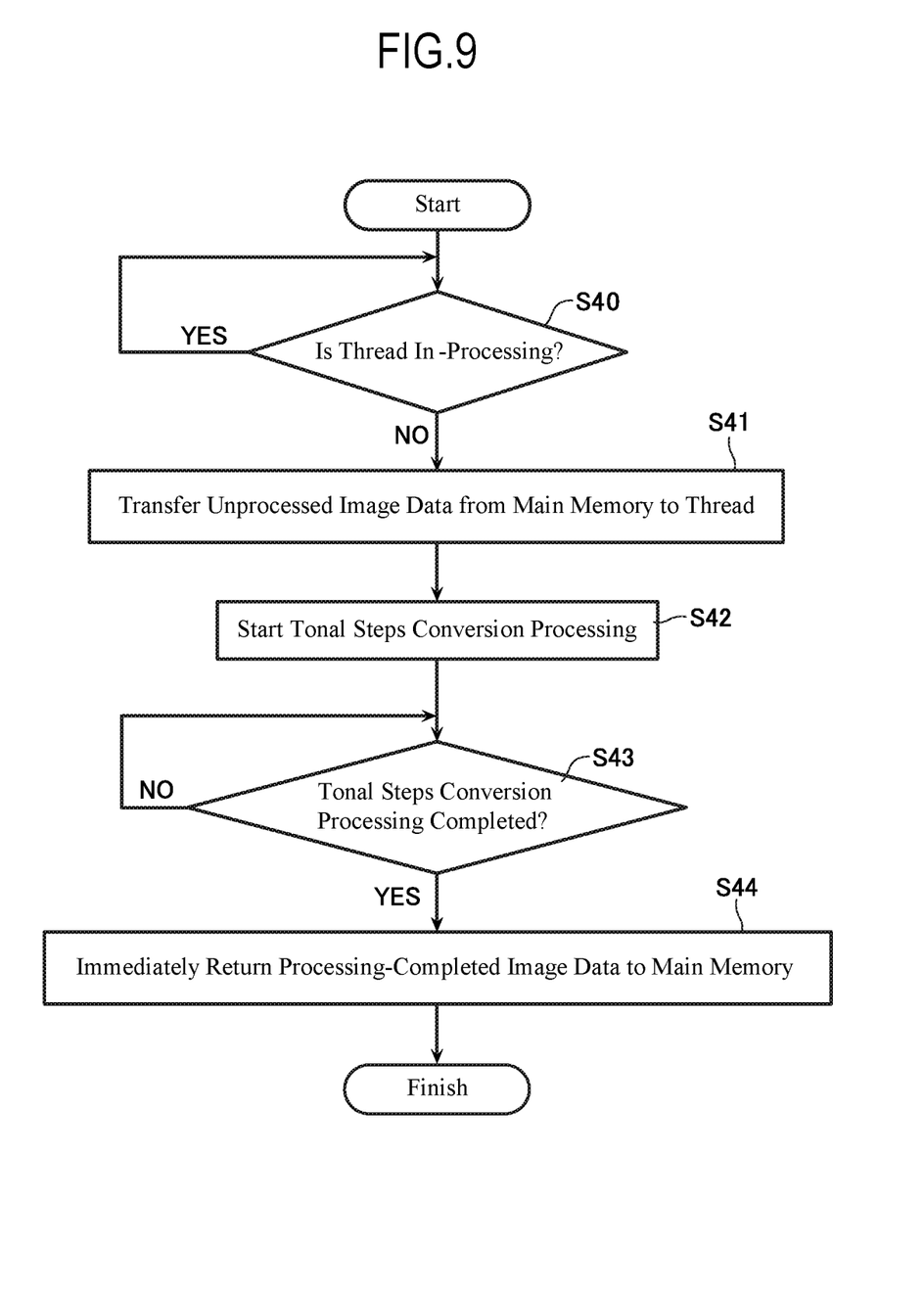
FIG. 9 is a flowchart (No. 2) showing an operation of the image processing device according to the first embodiment.

FIG. 9 is a flowchart showing data transfer processing in the main memory 14 and the data cache memory 22. First, the CPU 12 determines for a registration-completed arbitrary thread 18 whether said thread is in-processing or not (step S10). In the case that NO (not in-processing) is determined in said determination processing, the CPU 12 transfers unprocessed image data of the operand region 48 in the main memory 14 to said thread 18 which is not in-processing (step S41). The transferred image data is stored in the data cache memory 22 in said thread 18.

Next, the core 16 including said thread 18 begins tonal steps conversion processing of the transferred unprocessed image data (step S42). The CPU 12 determines whether tonal steps conversion processing by the core 16 has been completed or not (step S43), and in the case of determining that processing has been completed (YES in step S43), the processing-completed data is immediately returned again to the main memory 14 (step S44).

Now, if, after completion of the tonal steps conversion processing, the processing-completed data is held up in the data cache memory 22, the thread 18 cannot return to the standby state, hence execution of the next processing becomes impossible. In contrast, promptly returning the processing-completed image data in the data cache memory 22 to the main memory 14 as in step S44 of FIG. 9 makes it possible for the thread 18 to be restored to the standby state and the next processing to be promptly performed. On the contrary, by sending data to a thread 18 which is registration-completed for the post-step and is on standby and not in-processing when transferring unprocessed image data to a thread 18 side from the main memory 14 as in steps S40 to S41 of FIG. 9, occurrence of processing wait can be suppressed. As described above, it is preferable to adopt a configuration that prevents data from being mutually held up when performing transfer of image data between the main memory 14 and the data cache memory 22.

Moreover, in the above-described embodiment, the processing-completed image data returned to the main memory 14 is preferably transferred immediately to the next step (ink head-dedicated rearrangement processing shown in step 16 of FIG. 3), without storing in a nonvolatile memory device of long transfer time. As a result, the main memory 14 attains a state of always being capable of receiving processing-completed image data from the thread 18, and a holdup of processing-completed image data in the data cache memory 22 can be suppressed. As a result, speeding up of the image processing can be achieved.

Moreover, in the above-described embodiment, the CPU 12 preferably overwrites the next image data in the main memory 14 without erasing the image data in the main memory 14 at a stage where output to the print head control unit 4 of tonal steps conversion processing-completed image data has been completed. As a result, execution steps can be reduced. Moreover, it is preferable not to employ a nonvolatile memory device in storage of image data (unprocessed image data and processing-completed image data) described in the present embodiment. As a result, time is not taken up in data transfer between said nonvolatile memory device and the main memory 14, processing large capacity image data in real time while executing printing (on-the-fly printing) is enabled, and speeding up of the image processing can be achieved.

In the above-described embodiment, it is preferable that the core 16 of the CPU 12, in respective steps of rasterization processing, color separation processing, and tonal steps conversion processing, causes the program cache memory 22 to acquire from the main memory 14 a program required for executing each of the steps. By thus transferring to the program cache memory 22 the program required in processing, not only in the case of tonal steps conversion processing, but also in other image processing steps, data transfer amount between the main memory 14 and the program cache memory 20 can be reduced. As a result, speeding up of the image processing can be further achieved.

Second Embodiment

A second embodiment is an example contriving an allocation of a resource of parallelized processing in a CPU. Configurations of a printer and an image processing device according to the present embodiment are similar to those described in the first embodiment, and detailed descriptions thereof will be omitted.

As described in FIG. 3, image processing in the processing server 1 (image processing device) can be divided into the pre-step and the post-step. If a comparison is made using a CPU 12 having an identical processing speed, then generally a time required for processing for the post-step is longer compared to that for the pre-step. Therefore, in the parallelization of image processing described in FIG. 4, if the pre-step and the post-step are parallelized in an identical ratio, then processing of the pre-step ends up finishing first, and a processing wait occurs, hence the image processing ends up taking time. Moreover, there was a problem that parallelization of the pre-step requires a plurality of licenses of programs for performing rasterization processing to be acquired which is undesirable also in terms of cost.

Figure 10:
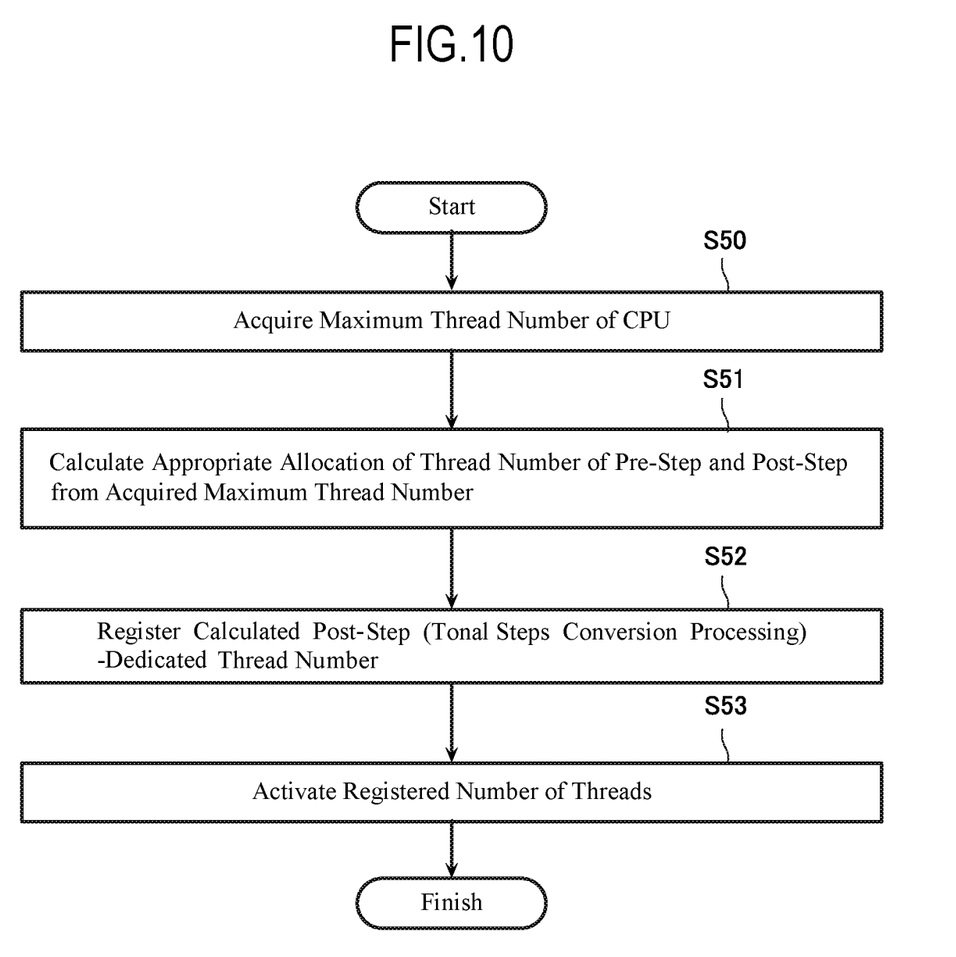
FIG. 10 is a flowchart showing an operation of an image processing device according to a second embodiment.

FIG. 10 is a flowchart showing an operation of the image processing device according to the second embodiment. First, the core 16 functioning as the control unit of the processing server 1 acquires the maximum number of threads capable of parallel operation in the CPU 12 (step S50). Next, the core 16 calculates an appropriate allocation of thread numbers to the pre-step and the post-step, according to a ratio of required times of computational processing in the pre-step and the post-step (step S51). Next, the core 16 registers the post-step-dedicated thread number calculated in step S51 (step S52). Next, the CPU 12 activates the threads 18 corresponding to the registered number (step S53). As a result, the number of threads 18 required in processing of the post-step attain an operation state. Then, as shown in steps S40 to S41 of FIG. 9, the CPU 12 transfers unprocessed image data to a thread 18 which is registration-completed for the post-step and is on standby and not performing the processing.

For example, in the present embodiment, each CPU 12 has six cores 16 and a total of 12 threads 18, hence a parallel processing number is 12. Now, if, for example, it is judged that with respect to a required time of the pre-step of 1, the required time of the post-step is 8, then the resource of parallel processing is preferably allocated in a ratio of 1:8. For example, it is conceivable that one or two threads 18 of one core 16 are allocated to the pre-step and the remaining cores 16 and threads 18 are allocated to the post-step. As a result, processing wait time between each of the steps can be shortened, and processing speed of the image processing can be further achieved. Furthermore, the number of acquisitions of licenses required in rasterization processing of the pre-step can be suppressed, hence a printing system can be achieved at low cost.

Third Embodiment

Figure 11:
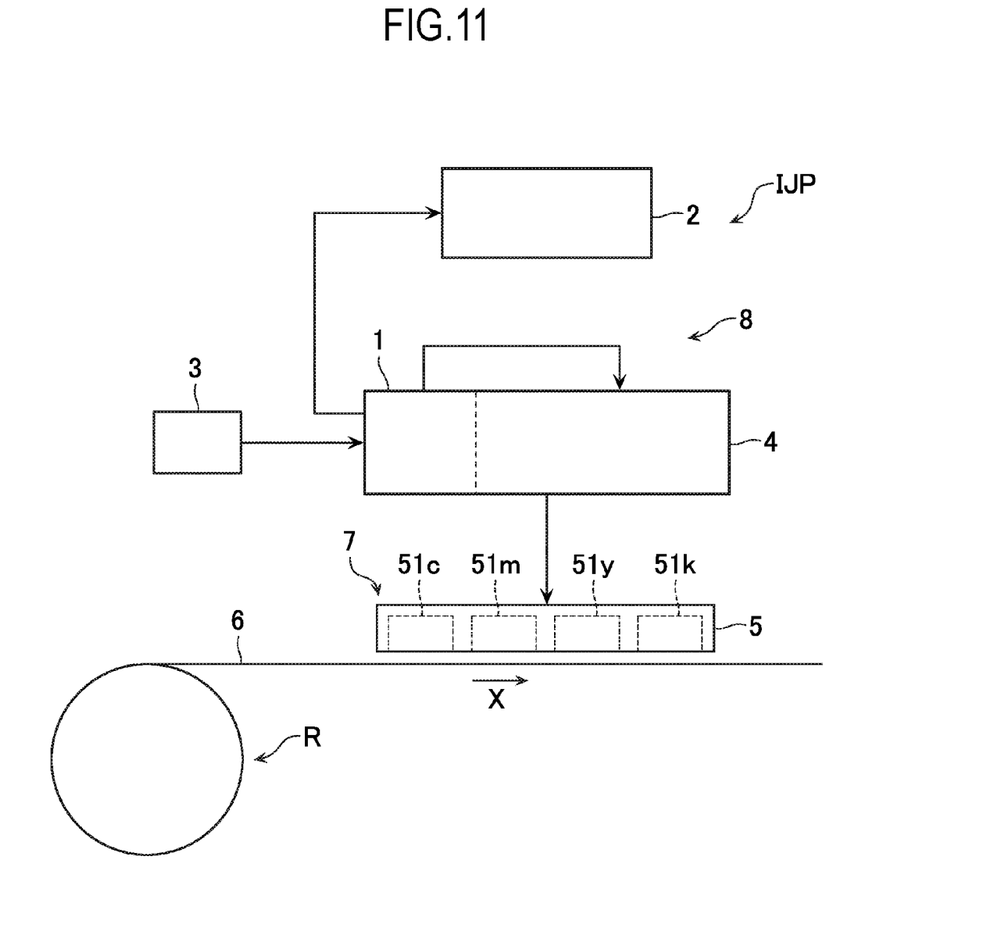
FIG. 11 is an overall schematic view of a printer including an image processing device according to a third embodiment.

FIG. 11 is an overall schematic view of a printer including an image processing device according to a third embodiment. Contrary to in the first embodiment (FIG. 1), a processing server 1 and a print head control unit 4 are housed in an identical housing 8 (server rack). Other configurations are similar to those of the first embodiment, hence detailed descriptions thereof will be omitted.

Due to the above-described configuration, connection of the processing server 1 and the print head control unit 4 can be performed at a short distance, hence a shortening of transfer time of data is enabled, and moreover, an installation space of the server can be reduced to half. Moreover, it is no longer necessary for a costly high-speed data transfer-dedicated optical cable to be led over a long distance, hence risk of malfunction can be reduced and a cost reduction can be achieved. Moreover, by the processing server 1 and the print head control unit 4 being gathered in one server rack, maintenance/management of the server are made easy, and handling of power supply facilities or facilities on a building side such as reinforcement of a floor for the server rack, and so on, can also be completed in one place, and a cost reduction can be achieved. Furthermore, a power supply inside the server rack, and so on, can also be gathered into one, hence utilization efficiency of energy rises, and energy saving is achieved. As a result, it is also possible for running costs to be lowered.

Other Embodiments

Several embodiments of the present invention have been described above, but these embodiments have been presented as examples, and are not intended to limit the scope of the inventions. These novel embodiments are capable of being implemented in a variety of other forms; and various omissions, substitutions and changes may be made in a range not departing from the spirit of the inventions. These embodiments or their modifications are included in the scope or spirit of the inventions, and are included in the scope of the inventions described in the claims and their equivalents.

DESCRIPTION OF REFERENCE NUMERALS 1 processing server
2 printer control unit
3 paper conveying unit
4 print head control unit
5 print head unit
6 printing paper
7 printing unit
8 housing
10 system board
12 CPU
14 main memory
16 core
18 thread
20 program cache memory
22 data cache memory
40 whole region
42 central region
44 peripheral region
46 boundary line
48 operand region
R roll paper
X printing paper moving direction

The invention claimed is:

1. An image processing device, comprising:
a main memory that stores image data, a peripheral region excluding a central region where image processing is required, of a whole region of the image data being set to a certain value; and
a CPU that performs tonal steps conversion processing on the image data,
the CPU including:
a plurality of cores that have a parallel processing function due to a plurality of threads and that execute the tonal steps conversion processing in parallel; and
a data cache memory provided corresponding to each of the plurality of threads, and
the core specifying a region smaller than a size of the data cache memory, of the image data as an operand region, and causing the image data corresponding to said operand region to be acquired from the main memory into the data cache memory and executing the tonal steps conversion processing on said operand region without distinction of the central region and the peripheral region.

2. The image processing device according to claim 1, wherein
the CPU includes a program cache memory provided corresponding to each of the plurality of threads, and
the core causes the program cache memory to acquire from the main memory a program required for executing the tonal steps conversion processing.

3. The image processing device according to claim 1, wherein
a data size of the operand region is determined based on a line size of the data cache memory.

4. The image processing device according to claim 1, wherein the core acquires a maximum thread number which is the number of the threads capable of parallel operation in the CPU, and registers the maximum thread number as the number of the threads used in the tonal steps conversion processing.

5. The image processing device according to claim 4, wherein the core transfers image data from the main memory to the data cache memory corresponding to a standby thread not performing the tonal steps conversion processing, of the registered threads, and, immediately after completion of the tonal steps conversion processing, returns image data in the data cache memory to the main memory.

6. The image processing device according to claim 1, wherein the CPU is capable of respectively executing: a pre-step including a step of generating the image data by rasterization processing and color separation processing; and a post-step including a step of performing tonal steps conversion processing on the image data, and the core acquires a maximum thread number which is the number of the threads capable of parallel operation in the CPU, calculates allocation of a thread number to the pre-step and the post-step from the maximum thread number acquired, and registers the thread number calculated, as the number of the threads used in processing of the post-step.

7. The image processing device according to claim 6, wherein the CPU includes a program cache memory provided corresponding to each of the plurality of threads, and the core, in respective steps of the rasterization processing, the color separation processing, and the tonal steps conversion processing, causes the program cache memory to acquire from the main memory a program required for executing each of the steps.

8. The image processing device according to claim 1, wherein the main memory is a volatile memory.

* * * * *